US012643177B2

(12) United States Patent (10) Patent No.: US 12,643,177 B2
Ogiwara et al. (45) Date of Patent: Jun. 2, 2026

(54) LASER PROCESSING DEVICE

(71) Applicant: HAMAMATSU PHOTONICS K.K., Hamamatsu (JP)

(72) Inventors: Takafumi Ogiwara, Hamamatsu (JP); Tsubasa Hirose, Hamamatsu (JP); Takeshi Sakamoto, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 1032 days.

(21) Appl. No.: 17/781,146

(22) PCT Filed: Dec. 2, 2020

(86) PCT No.: PCT/JP2020/044907

§ 371 (c)(1),
(2) Date: May 31, 2022

(87) PCT Pub. No.: WO2021/112137

PCT Pub. Date: Jun. 10, 2021

(65) Prior Publication Data

US 2022/0410311 A1 Dec. 29, 2022

(30) Foreign Application Priority Data

Dec. 4, 2019 (JP) ................................. 2019-219470

(51) Int. Cl.
*B23K 26/064* (2014.01)
*B23K 26/06* (2014.01)
(52) U.S. Cl.
CPC ...... *B23K 26/0648* (2013.01); *B23K 26/0665* (2013.01)

(58) Field of Classification Search
CPC ........................ B23K 26/0648; B23K 26/0665
(Continued)

(56) References Cited

U.S. PATENT DOCUMENTS 5,661,592 A * 8/1997 Bornstein ............ G02B 5/1828
359/224.1
5,703,709 A * 12/1997 Mori ........................ B41M 5/34
347/256

(Continued)

FOREIGN PATENT DOCUMENTS

CN 1473088 A 2/2004
CN 102489883 A 6/2012
(Continued)

OTHER PUBLICATIONS

International Preliminary Report on Patentability mailed Jun. 16, 2022 for PCT/JP2020/044907.

*Primary Examiner* — Jimmy Chou
(74) *Attorney, Agent, or Firm* — Faegre Drinker Biddle & Reath LLP

(57) ABSTRACT

A laser processing device comprising: a light source configured to output laser light; a spatial light modulator configured to display a modulation pattern for modulating the laser light output from the light source; a condenser lens configured to condense the laser light modulated by the spatial light modulator, on an object; and a control unit configured to control the spatial light modulator to adjust the modulation pattern in accordance with a traveling direction of a condensing point of the laser light with respect to the object.

7 Claims, 17 Drawing Sheets

(58) Field of Classification Search
USPC ...................................................... 219/121.6
See application file for complete search history.

(56) References Cited

U.S. PATENT DOCUMENTS

| | | | | |
|---|---|---|---|---|
| 6,388,780 | B1 * | 5/2002 | Monaghan | G03H 1/30 |
| | | | | 359/25 |
| 7,064,883 | B2 * | 6/2006 | Payne | G02B 26/001 |
| | | | | 359/290 |
| 7,215,461 | B1 * | 5/2007 | Leung | G02B 26/0841 |
| | | | | 359/566 |
| 7,227,687 | B1 * | 6/2007 | Trisnadi | G02B 26/0841 |
| | | | | 359/279 |
| 7,277,110 | B2 * | 10/2007 | Zarem | B41J 2/32 |
| | | | | 347/185 |
| 8,285,131 | B1 * | 10/2012 | Myatt | G02B 26/0808 |
| | | | | 396/20 |
| 8,842,359 | B1 * | 9/2014 | Payne | G02B 26/0808 |
| | | | | 359/291 |
| 11,016,287 | B2 * | 5/2021 | Payne | G02B 26/0808 |
| 11,327,288 | B2 * | 5/2022 | Haarstrich | G02B 21/367 |
| 2004/0001264 | A1 * | 1/2004 | Gudeman | G02B 26/0808 |
| | | | | 359/883 |
| 2004/0057101 | A1 * | 3/2004 | Hunter | G02B 26/0841 |
| | | | | 359/290 |
| 2005/0212004 | A1 * | 9/2005 | Payne | G02B 26/0808 |
| | | | | 257/98 |
| 2005/0212893 | A1 * | 9/2005 | Zarem | B41J 2/32 |
| | | | | 347/185 |
| 2006/0098266 | A1 * | 5/2006 | Payne | G02B 26/0808 |
| | | | | 359/291 |
| 2008/0179182 | A1 * | 7/2008 | Remadna | G02B 26/001 |
| | | | | 216/13 |
| 2010/0149625 | A1 * | 6/2010 | Lu | B81C 1/00238 |
| | | | | 359/291 |
| 2010/0239299 | A1 * | 9/2010 | Mori | G03G 15/55 |
| | | | | 219/494 |
| 2011/0266261 | A1 * | 11/2011 | Nakano | B23K 26/53 |
| | | | | 219/121.6 |
| 2011/0300691 | A1 * | 12/2011 | Sakamoto | B23K 26/0622 |
| | | | | 257/E21.599 |
| 2011/0309060 | A1 * | 12/2011 | Iwaki | B23K 26/53 |
| | | | | 219/121.72 |
| 2011/0316200 | A1 * | 12/2011 | Iwaki | B23K 26/064 |
| | | | | 264/400 |
| 2012/0327501 | A1 * | 12/2012 | Sakamoto | B23K 26/53 |
| | | | | 359/290 |
| 2012/0329247 | A1 * | 12/2012 | Sakamoto | B23K 26/53 |
| | | | | 257/E21.599 |
| 2014/0251963 | A1 * | 9/2014 | Kawaguchi | B23K 26/53 |
| | | | | 219/121.73 |
| 2015/0343562 | A1 * | 12/2015 | Hirose | B23K 26/0648 |
| | | | | 425/135 |
| 2016/0085067 | A1 * | 3/2016 | Payne | G02B 5/0825 |
| | | | | 219/121.61 |
| 2017/0106476 | A1 * | 4/2017 | Sakamoto | B23K 26/064 |
| 2017/0216973 | A1 * | 8/2017 | Sakamoto | C03B 33/0222 |
| 2018/0126491 | A1 * | 5/2018 | Nakagawa | B23K 26/0626 |
| 2018/0299664 | A1 * | 10/2018 | Payne | G02B 26/10 |
| 2019/0116346 | A1 * | 4/2019 | Hashimoto | G02B 13/0005 |
| 2020/0026066 | A1 * | 1/2020 | Payne | G02B 26/0841 |
| 2020/0247052 | A1 * | 8/2020 | Payne | B23K 26/066 |

FOREIGN PATENT DOCUMENTS

| | | | | |
|---|---|---|---|---|
| CN | 105102179 | A | 11/2015 | |
| JP | S54-004208 | A | 1/1979 | |
| JP | 2011051011 | A * | 3/2011 | .......... B23K 26/0676 |
| JP | 5743123 | B1 | 7/2015 | |
| JP | 2017-064745 | A | 4/2017 | |

* cited by examiner

*Fig.7*
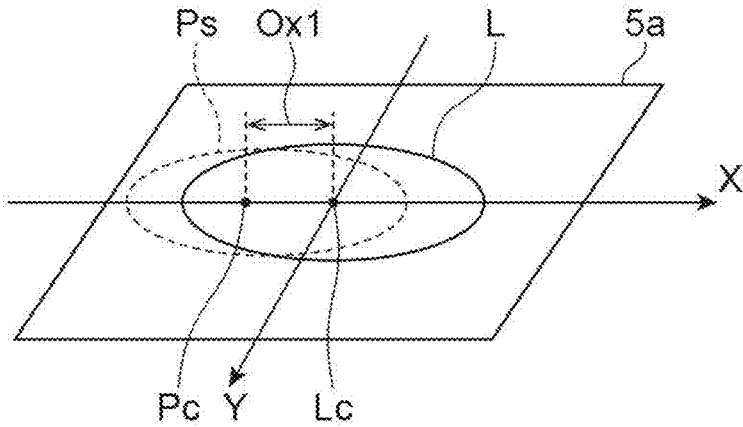
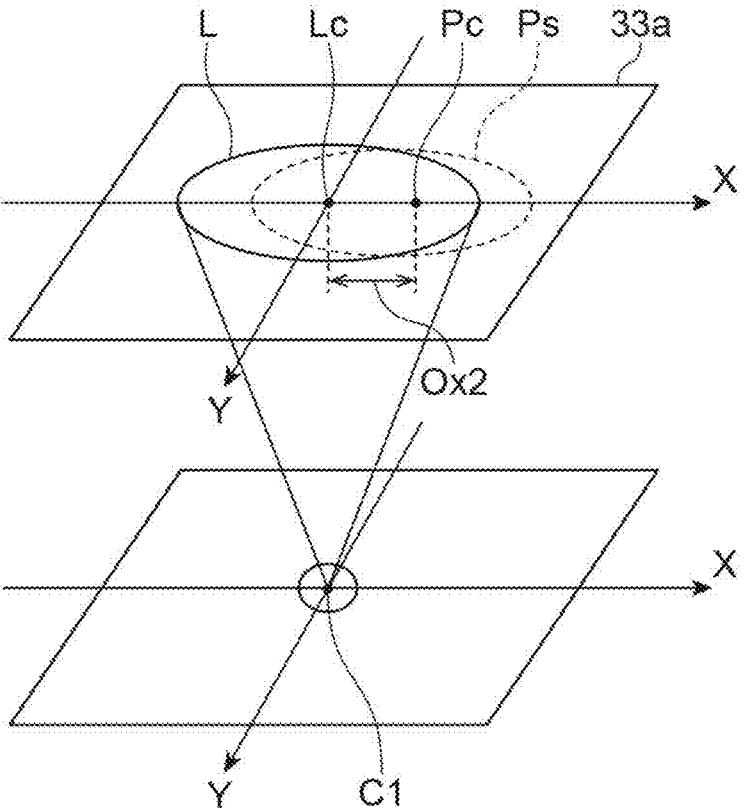

*Fig.8*
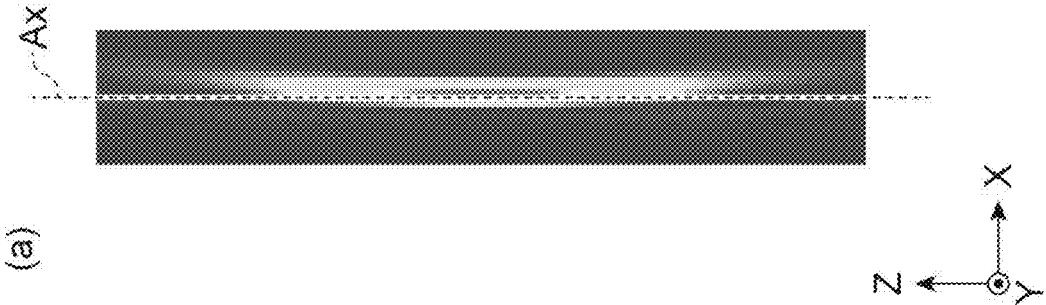
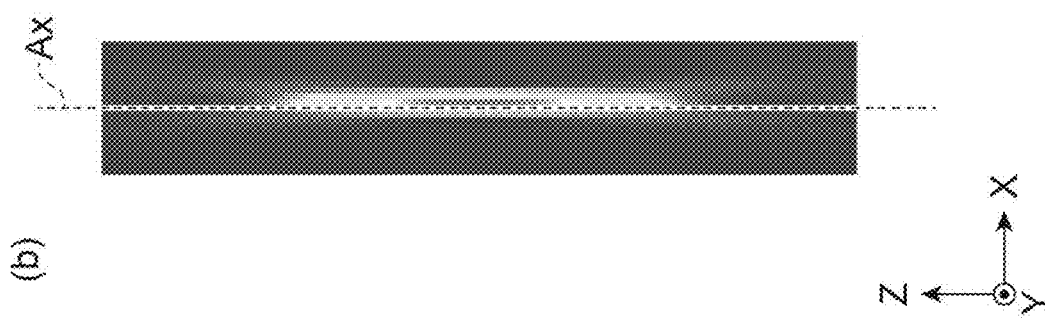
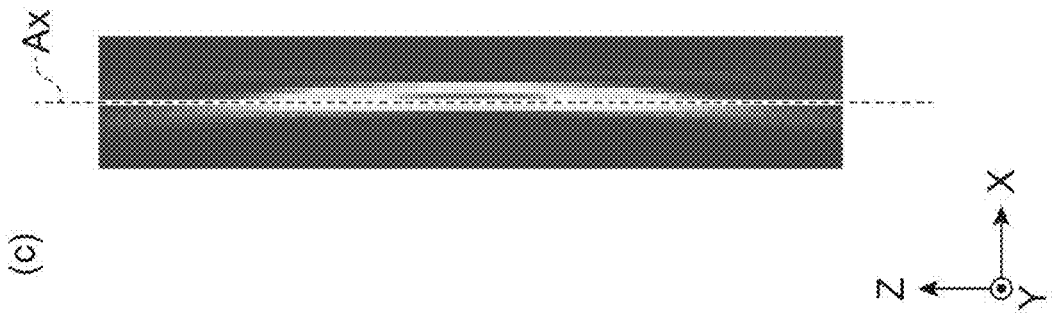

*Fig.9*

| OFFSET [pixel] SLM PLANE | -5 | -3 | -1 | 0 | 1 | 3 | 5 |
|---|---|---|---|---|---|---|---|
| PUPIL PLANE | 5 | 3 | 1 | 0 | -1 | -3 | -5 |
| BE[μm] | | | | 150 | | | |
| Z[μm] | | | | 150 | | | |
| ∵CP[μm] | | | | 0 | | | |
| OPTICAL-AXIS CROSS SECTION (IN Si) | | | | | | | |
| (TERTIARY) COMA ABERRATION | Lv7 | Lv4 | Lv1 | Lv0 (NO COMA ABERRATION) | Lv-1 | Lv-4 | Lv-7 |

| X-offset (pixel) | | FRACTURE | |
|---|---|---|---|
| FORWARD PATH | BACKWARD PATH | FORWARD PATH | BACKWARD PATH |
| +6.5 | | B | C |
| +4.5 | | B | A |
| +2.5 | | B | A |
| REFERENCE | | A | A |
| -2.5 | | A | B |
| -4.5 | | A | B |
| -6.5 | | C | B |

(b)

| X-offset (pixel) | | FRACTURE | |
|---|---|---|---|
| FORWARD PATH | BACKWARD PATH | FORWARD PATH | BACKWARD PATH |
| +4.5 | +8.5 | C | C |
| +2.5 | +6.5 | B | B |
| REFERENCE | +4.5 | A | A |
| -2.5 | +2.5 | A | A |
| -4.5 | REFERENCE | A | A |
| -6.5 | -1.5 | C | B |
| -8.5 | -2.5 | C | B |

(a)

| OFFSET [pixel] SLM PLANE | -5 |
|---|---|
| PUPIL PLANE | 5 |
| BE[μm] | 150 |
| Z[μm] | 150 |
| ∴CP[μm] | 0 |
| OPTICAL-AXIS CROSS SECTION (IN Si) | |
| (TERTIARY) COMA ABERRATION | Lv7 |

(b)

| PATTERN | COMA | Airy Beam | |
|---|---|---|---|
| OPTICAL-AXIS CROSS SECTION (IN Si) | | | |
| (TERTIARY) COMA ABERRATION | Lv7 | Lv8 | Lv4 |
| TERTIARY ASTIGMATISM | 0 | Lv-9 | Lv-4 |

(a)

K1          103

LBA OFFSET AMOUNT FORWARD PATH: -2.5 BACKWARD PATH: +2.5

(b)

| | |
|---|---|
| ADDRESS OF LBA OF PUPIL XY CENTER | X-15.5 Y-23.5 |
| ADDRESS OF LBA IN FORWARD PROCESSING | X-18.0 Y-23.5 |
| ADDRESS OF LBA IN BACKWARD PROCESSING | X-13.0 Y-23.5 |

LASER PROCESSING DEVICE

TECHNICAL FIELD

The present disclosure relates to a laser processing device.

BACKGROUND ART

Patent Literature 1 discloses a laser dicing device. The laser dicing device includes a stage that moves a wafer, a laser head that irradiates the wafer with laser light, and a control unit that controls each unit. The laser head includes a laser light source that emits processing laser light for forming a modified region in the wafer, a dichroic mirror and a condenser lens that are sequentially arranged on an optical path of the processing laser light, and an AF device.

CITATION LIST

Patent Literature

Patent Literature 1: Japanese Patent No. 5743123

SUMMARY OF INVENTION

Technical Problem

Meanwhile, for example, in the laser dicing device as described above, the shape (may be referred to as a "condensing shape" below) of a condensing point of the laser light has an influence on the processing result such as the extension amount of a fracture from the modified region. In addition, in a case where the condensing shape is maintained constant, the traveling direction (may be referred to as a "laser traveling direction" below) of the condensing point of the laser light with respect to an object such as a wafer has an influence on the processing result. Thus, in the above technical field, it is desirable that the condensing shape is allowed to be adjusted in accordance with the laser traveling direction.

Therefore, an object of the present disclosure is to provide a laser processing device capable of adjusting a condensing shape of laser light in accordance with a traveling direction of a condensing point of the laser light.

Solution to Problem

That is, according to the present disclosure, a laser processing device includes a light source configured to output laser light, a spatial light modulator configured to display a modulation pattern for modulating the laser light output from the light source, a condenser lens configured to condense the laser light modulated by the spatial light modulator, on an object, and a control unit configured to control the spatial light modulator to adjust the modulation pattern in accordance with a traveling direction of a condensing point of the laser light with respect to the object.

The laser processing device includes a spatial light modulator. Thus, the control unit may adjust a condensing shape by adjusting the modulation pattern displayed on the spatial light modulator. In particular, in the laser processing device, the control unit adjusts the modulation pattern in accordance with a laser traveling direction and displays the adjusted modulation pattern on the spatial light modulator. As described above, according to the laser processing device, it is possible to adjust a condensing shape in accordance with a laser traveling direction.

Meanwhile, the condensing shape may be adjusted by adjusting the modulation pattern displayed on the spatial light modulator as described above. Thus, in order to obtain a desired processing result, it is desirable to secure a sufficient margin for adjustment of the modulation pattern. Meanwhile, the present discloser has found a problem that, if the modulation pattern (that is, the condensing shape) is set to be adjusted collectively (while being maintained constant) between a case where processing is performed by moving the condensing point of laser light in one direction with respect to a wafer and a case where processing is performed by moving the condensing point of the laser light in the opposite direction, a margin for adjustment is small.

The inventor of the present invention has studied to solve the above problem, and found that, if the modulation pattern is adjusted in accordance with the traveling direction (laser traveling direction) of the condensing point of the laser light with respect to the wafer, the margin for adjustment of the modulation pattern is enlarged. As a result, it is possible to obtain a desired processing result regardless of the laser traveling direction. As a result of further research based on the knowledge, the inventor of the present invention has completed the following invention.

That is, in the laser processing device according to the present disclosure, the control unit may individually adjust the modulation pattern in a first case where the condensing point travels in a first direction with respect to the object, and a second case where the condensing point travels in a second direction opposite to the first direction, with respect to the object. As described above, by individually adjusting the modulation pattern in a case where the laser traveling direction is the first direction and a case where the laser traveling direction is the second direction opposite to the first direction, the margin for adjustment of the modulation pattern is enlarged.

In the laser processing device according to the present disclosure, the control unit may adjust the modulation pattern so that a shape of the condensing point becomes an arc shape protruding in the first direction, in the first case, and adjust the modulation pattern so that the shape of the condensing point becomes an arc shape protruding in the second direction, in the second case. As described above, by adjusting the modulation pattern so that the condensing shape of the laser light becomes an arc shape protruding in the traveling direction, it is possible to increase the amount of development of a fracture from the modified region formed at the condensing point of the laser light.

In the laser processing device according to the present disclosure, the control unit may adjust the modulation pattern so that a shape of the condensing point becomes an arc shape protruding in the second direction, in the first case, and adjust the modulation pattern so that the shape of the condensing point becomes an arc shape protruding in the first direction, in the second case. As described above, by adjusting the modulation pattern so that the condensing shape of the laser light becomes an arc shape protruding in an opposite direction of the traveling direction, it is possible to suppress the development of a fracture from a modified region formed at the condensing point of the laser light.

According to the present disclosure, a laser processing device includes a display unit configured to display information and an input unit configured to receive an input. The display unit may display information for urging an input of a parameter for adjusting a modulation pattern. The input unit may receive the input of the parameter. The control unit may adjust the modulation pattern based on the parameter received by the input unit. In this case, it is possible to adjust the modulation pattern in accordance with an input of a user.

In the laser processing device according to the present disclosure, the modulation pattern may include a spherical aberration correction pattern for correcting a spherical aberration of the laser light, and the parameter may include an offset amount of a center of the spherical aberration correction pattern along the traveling direction, with respect to a center of a pupil surface of the condenser lens. As described above, by setting the offset amount of the spherical aberration correction pattern as the parameter, it is possible to adjust a condensing shape of laser light (for example, adjust the condensing shape to the arc shape described above) so that an extension amount of a fracture is controlled.

In the laser processing device according to the present disclosure, the modulation pattern may include a coma aberration pattern for applying a positive coma aberration to the laser light, and the parameter may include a magnitude of the coma aberration. As described above, even though the magnitude of the coma aberration to be applied to the laser light is set as the parameter, it is possible to adjust the condensing shape of the laser light (for example, adjust the condensing shape to the arc shape described above) so that the extension amount of the fracture is controlled, similar to a case where the offset amount of the spherical aberration correction pattern is set as the parameter.

Advantageous Effects of Invention

According to the present disclosure, it is possible to provide a laser processing device capable of adjusting a condensing shape of laser light in accordance with a traveling direction of a condensing point of the laser light.

BRIEF DESCRIPTION OF DRAWINGS

FIG. 7 is a schematic view for explaining an example of adjustment of a condensing shape.

FIG. 8 is a view illustrating an example of the condensing shape.

FIG. 9 is a view illustrating a change in the condensing shape when an offset amount of a spherical aberration correction pattern is changed in a plurality of stages.

FIG. 11 is a table illustrating a relation between the offset amount of the spherical aberration correction pattern and a processing result.

DESCRIPTION OF EMBODIMENTS

Figure 1:
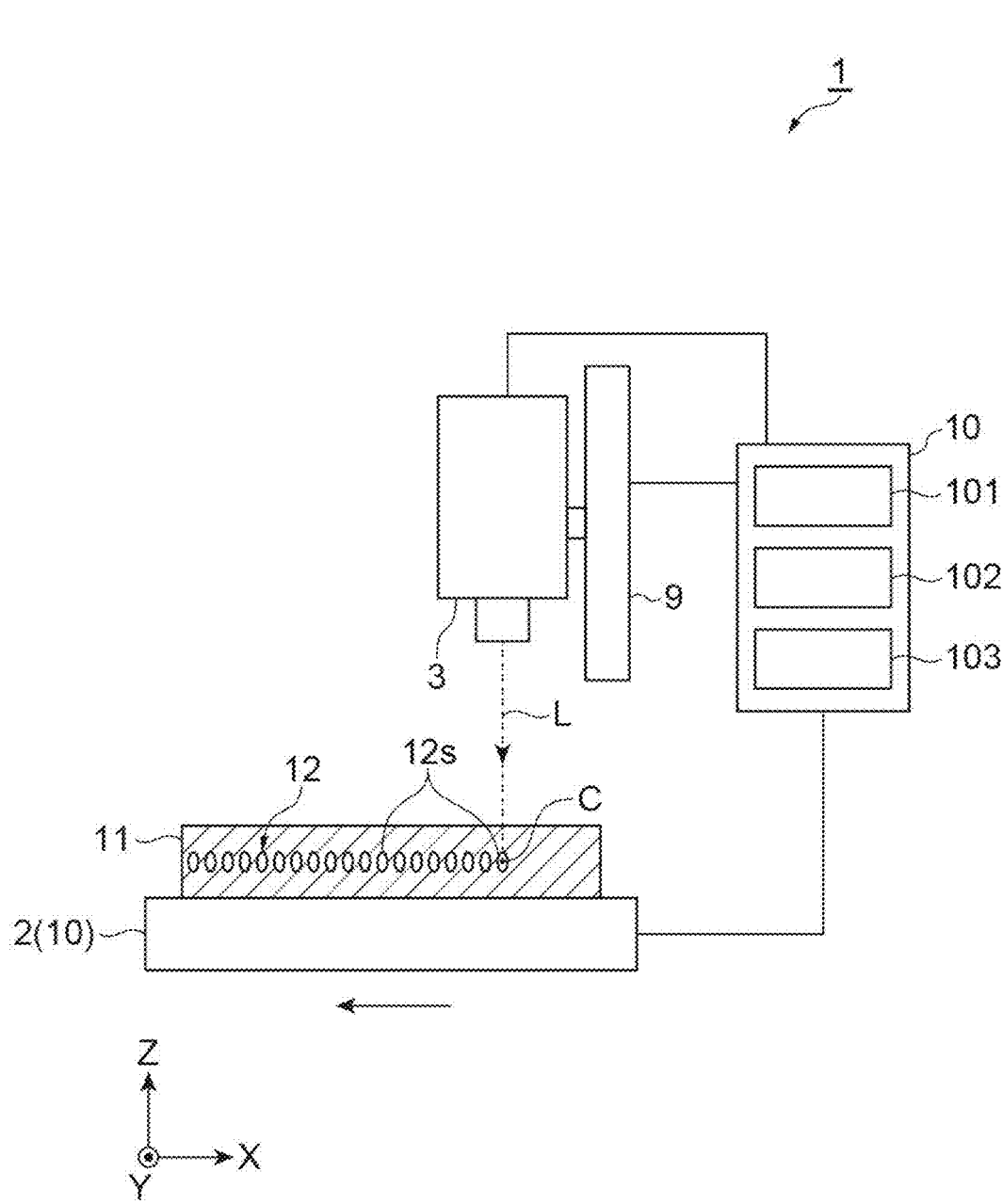
FIG. 1 is a schematic diagram illustrating a configuration of a laser processing device according to an embodiment.

Hereinafter, embodiments will be described in detail with reference to the drawings. In the drawings, the same or the corresponding parts are denoted by the same reference signs, and repetitive descriptions thereof will be omitted. In addition, each drawing may illustrate an orthogonal coordinate system defined by an X-axis, a Y-axis, and a Z-axis.

FIG. 1 is a schematic diagram illustrating a configuration of a laser processing device according to an embodiment. As illustrated in FIG. 1, a laser processing device 1 includes a stage 2, a laser irradiation unit 3, a drive unit 9, and a control unit 10. The laser processing device 1 is a device that forms a modified region 12 on an object 11 by irradiating the object 11 with laser light L.

The stage 2 supports the object 11 by, for example, adsorbing a film attached to the object 11. The stage 2 can move along an X-direction and a Y-direction, respectively, and can rotate around an axis parallel to a Z-direction as a center line. The X-direction and the Y-direction are referred to as a first horizontal direction and a second horizontal direction that intersect with each other (are perpendicular to each other), and the Z-direction is referred to as a vertical direction.

The laser irradiation unit 3 condenses the laser light L having transparency on the object 11 to irradiate the object 11 with the laser light. If the laser light L is focused in the object 11 supported by the stage 2, the laser light L is particularly absorbed at a portion corresponding to a condensing point C of the laser light L, and thus the modified region 12 is formed in the object 11.

The modified region 12 is a region in which the density, the refractive index, the mechanical strength, and other physical properties are different from those of the surrounding non-modified region. Examples of the modified region 12 include a melting treatment region, a fracture region, a dielectric breakdown region, and a refractive index change region. The modified region 12 may be formed so that a fracture extends from the modified region 12 to the incident side of the laser light L and the opposite side thereof. Such a modified region 12 and a fracture are used, for example, to cut the object 11.

As an example, if the stage 2 is moved along the X-direction and the condensing point C is moved relative to the object 11 along the X-direction, a plurality of modified spots 12s is formed to be arranged in one row along the X-direction. One modified spot 12s is formed by irradiation with the laser light L of one pulse. The modified region 12 in one row is a set of a plurality of modified spots 12s arranged in one row. Adjacent modified spots 12s may be connected to each other or separated from each other, depending on the relative movement speed of the condensing point C with respect to the object 11 and the repetition frequency of the laser light L.

The drive unit 9 supports the laser irradiation unit 3. The drive unit 9 moves the laser irradiation unit 3 along the Z-direction.

The control unit 10 controls the operations of the stage 2, the laser irradiation unit 3, and the drive unit 9. The control unit 10 includes a processing unit 101, a storage unit 102, and an input reception unit (display unit, input unit) 103. The processing unit 101 is configured as a computer device including a processor, a memory, a storage, a communication device, and the like. In the processing unit 101, the processor executes software (program) read into the memory or the like, and controls reading and writing of data in the memory and the storage, and communication by a communication device. The storage unit 102 is, for example, a hard disk or the like, and stores various types of data. The input reception unit 103 is an interface unit that displays various types of information and receives inputs of various types of information from the user. In the present embodiment, the input reception unit 103 constitutes a graphical user interface (GUI).

[Configuration of Object]

Figure 2:
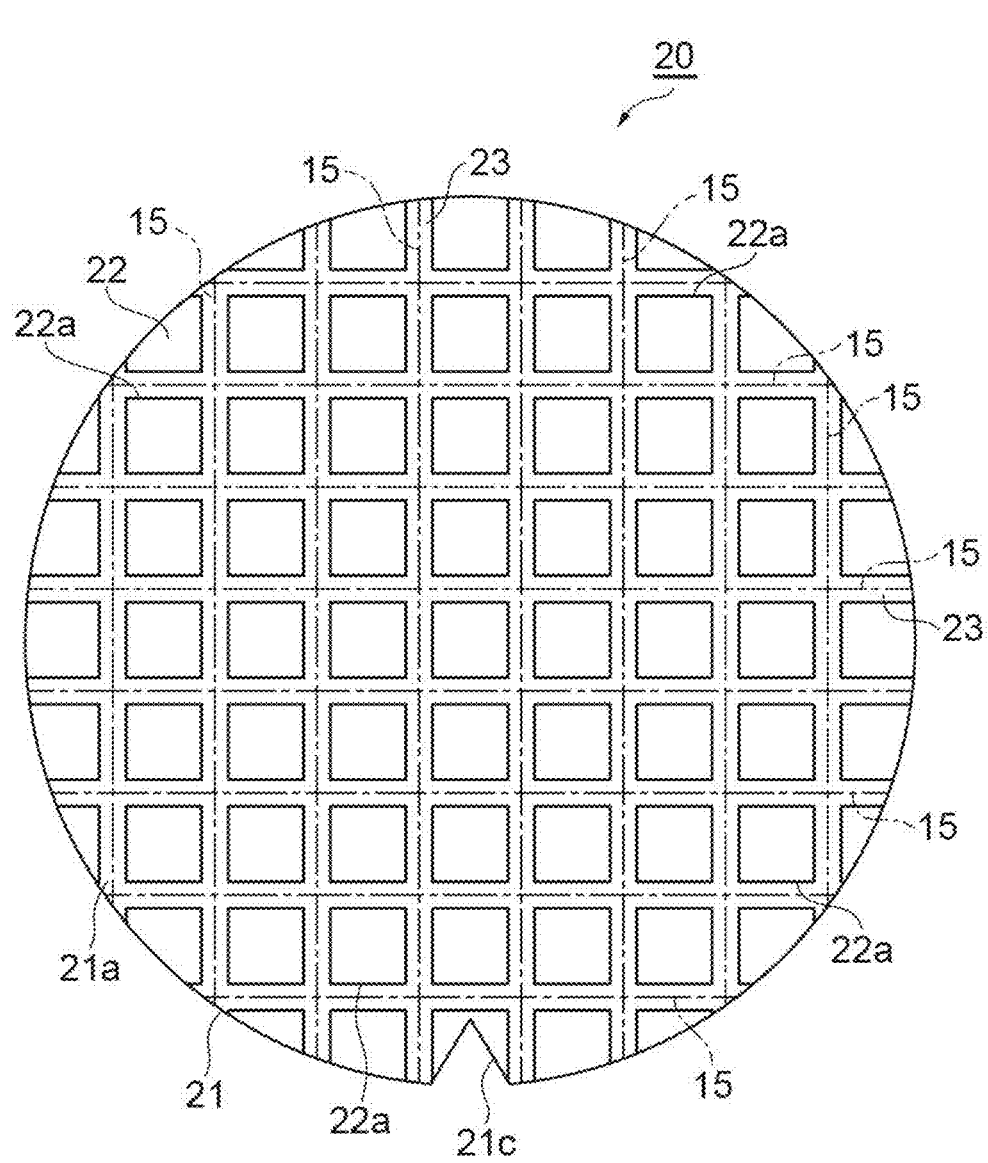
FIG. 2 is a plan view illustrating a wafer in the embodiment.
Figure 3:
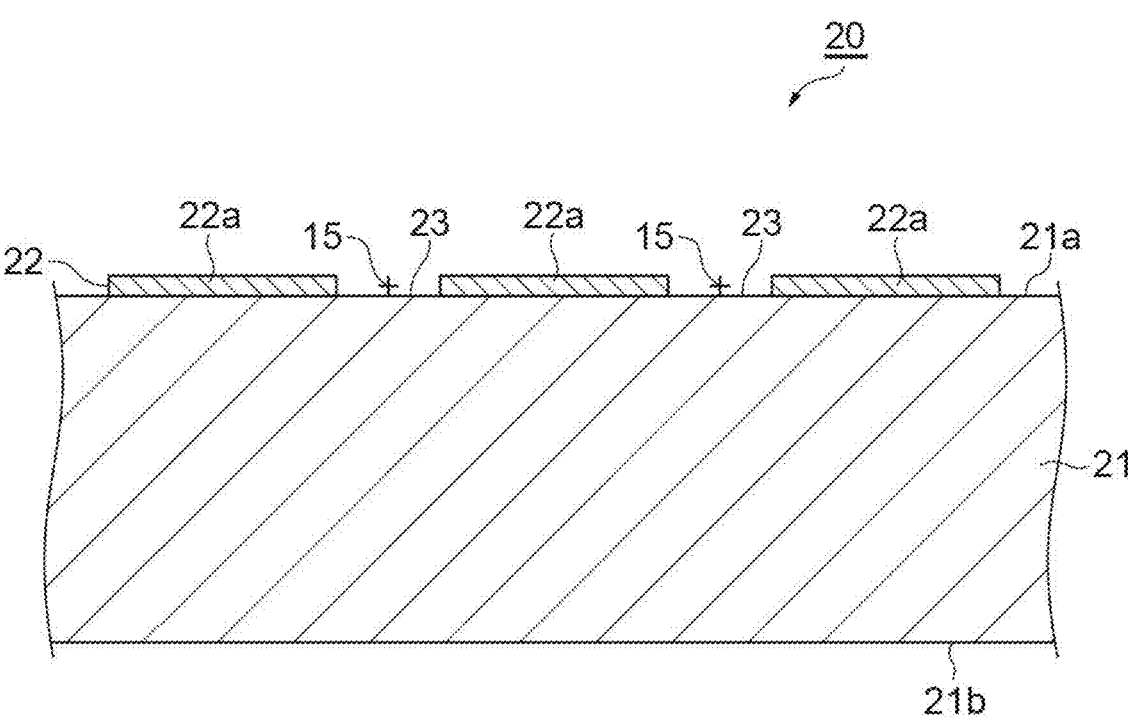
FIG. 3 is a cross-sectional view illustrating a portion of the wafer illustrated in FIG. 2.

FIG. 2 is a plan view illustrating a wafer in the embodiment. FIG. 3 is a cross-sectional view illustrating a portion of the wafer illustrated in FIG. 2. The object 11 in the present embodiment is a wafer 20 illustrated in FIGS. 2 and 3 as an example. The wafer 20 includes a semiconductor substrate 21 and a functional element layer 22. The semiconductor substrate 21 has a front surface 21a and a back surface 21b. As an example, the back surface 21b is a first surface serving as an incident surface of the laser light L or the like, and the front surface 21a is a second surface opposite to the first surface. The semiconductor substrate 21 is, for example, a silicon substrate. The functional element layer 22 is formed on the front surface 21a of the semiconductor substrate 21. The functional element layer 22 includes a plurality of functional elements 22a arranged two-dimensionally along the front surface 21a.

The functional element 22a is, for example, a light receiving element such as a photodiode, a light emitting element such as a laser diode, a circuit element such as a memory, or the like. The functional element 22a may be configured three-dimensionally by stacking a plurality of layers. Although the semiconductor substrate 21 is provided with a notch 21c indicating the crystal orientation, an orientation flat may be provided instead of the notch 21c.

The wafer 20 is cut into functional elements 22a along each of the plurality of lines 15. The plurality of lines 15 passes between a plurality of functional elements 22a in a case of being viewed from the thickness direction of the wafer 20. More specifically, the line 15 passes through the center (center in the width direction) of a street region 23 in a case of being viewed from the thickness direction of the wafer 20. The street region 23 extends to pass between adjacent functional elements 22a in the functional element layer 22. In the present embodiment, the plurality of functional elements 22a is arranged in a matrix along the front surface 21a, and the plurality of lines 15 are set in a grid. Although the line 15 is a virtual line, the line may be a line actually drawn.

[Configuration of Laser Irradiation Unit]

Figure 4:
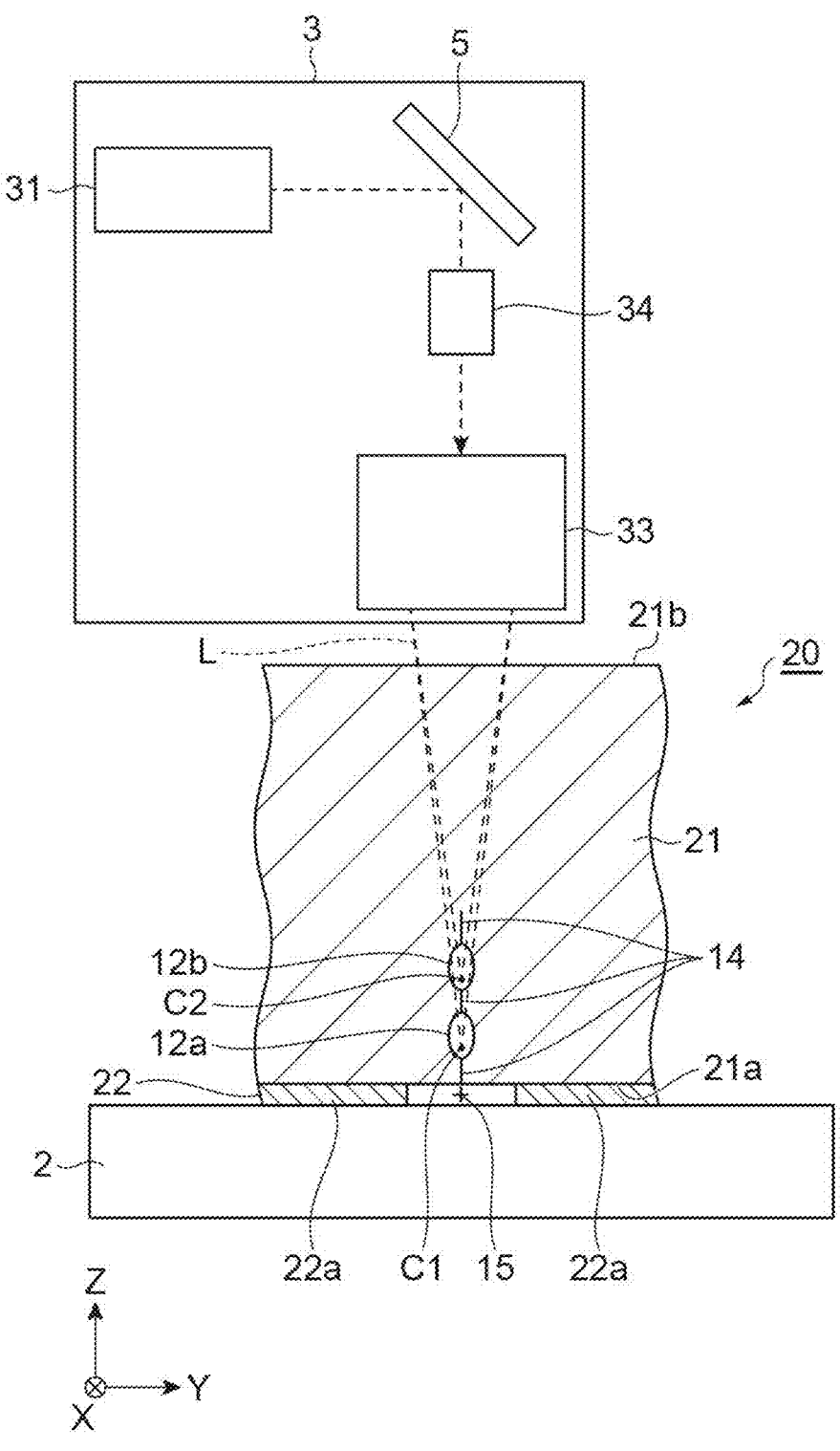
FIG. 4 is a schematic diagram illustrating a configuration of a laser irradiation unit illustrated in FIG. 1.
Figure 5:
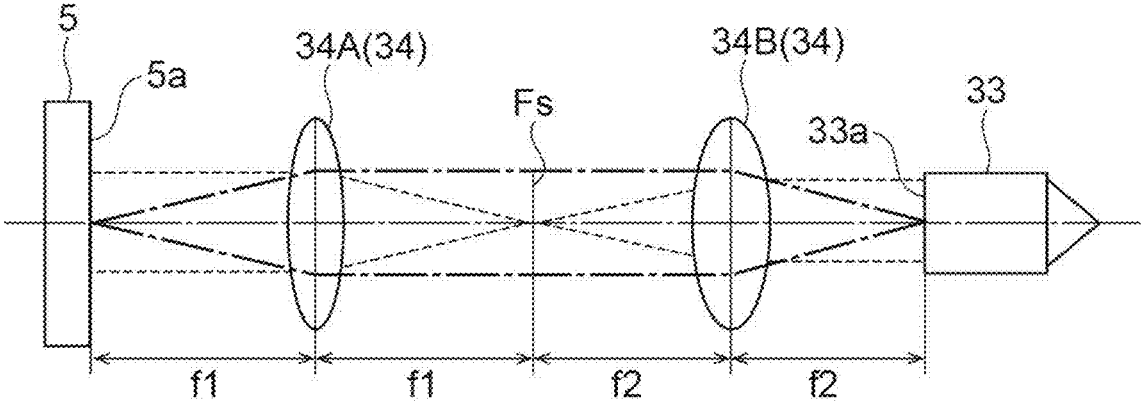
FIG. 5 is a view illustrating a relay lens unit illustrated in FIG. 4.
Figure 6:
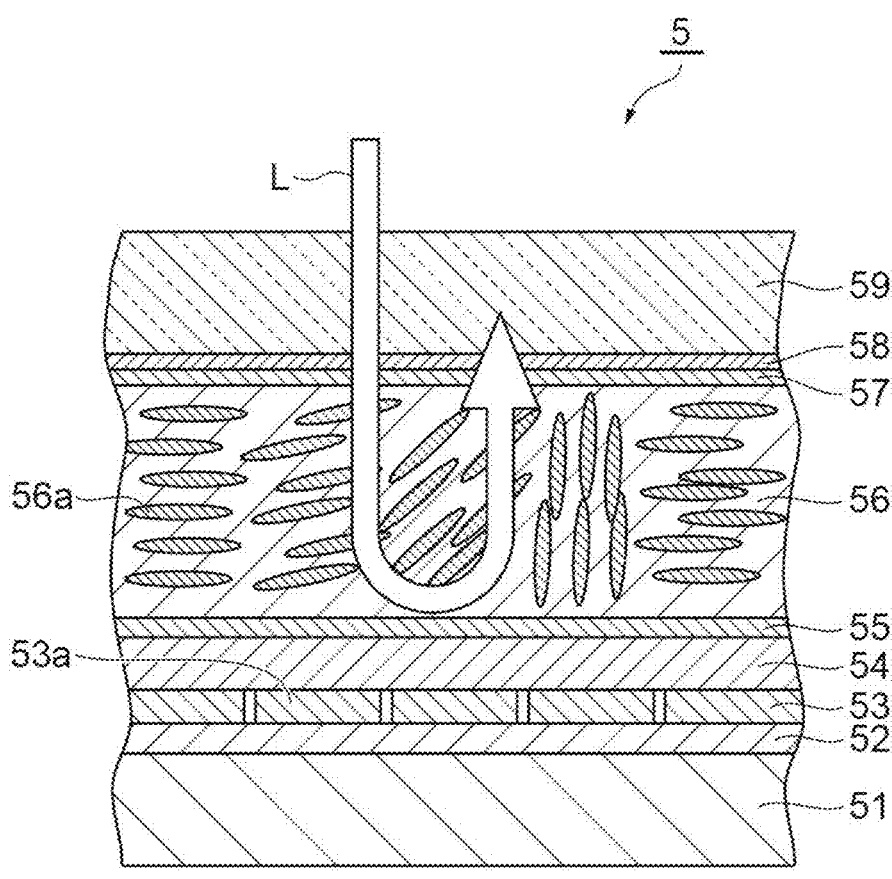
FIG. 6 is a partial cross-sectional view illustrating a spatial light modulator illustrated in FIG. 4.

FIG. 4 is a schematic diagram illustrating a configuration of the laser irradiation unit illustrated in FIG. 1. FIG. 5 is a view illustrating a relay lens unit illustrated in FIG. 4. FIG. 6 is a partial cross-sectional view illustrating a spatial light modulator illustrated in FIG. 4. The laser irradiation unit 3 includes a light source 31, a spatial light modulator 5, a condenser lens 33, and a 4f lens unit 34. The light source 31 outputs the laser light L by, for example, a pulse oscillation method. The laser irradiation unit 3 may not include the light source 31, and may be configured to introduce the laser light L from the outside of the laser irradiation unit 3.

The spatial light modulator 5 modulates the laser light L output from the light source 31. The condenser lens 33 condenses the laser light L modulated by the spatial light modulator 5 toward the object 11 (semiconductor substrate 21). The 4f lens unit 34 includes a pair of lenses 34A and 34B arranged on an optical path of the laser light L from the spatial light modulator 5 toward the condenser lens 33. The pair of lenses 34A and 34B constitute a both-side telecentric optical system in which a modulation surface 5a of the spatial light modulator 5 and an incident pupil surface (pupil surface) 33a of the condenser lens 33 have an imaging relation. Thus, an image of the laser light L on the modulation surface 5a of the spatial light modulator 5 (an image of the laser light L modulated in the spatial light modulator 5) is transferred (formed) to (on) an incident pupil surface 33a of the condenser lens 33. Fs in FIG. 5 indicates a Fourier plane.

The spatial light modulator 5 is a spatial light modulator (SLM) of a reflective liquid crystal (LCOS: Liquid Crystal on Silicon). The spatial light modulator 5 is configured in a manner that a drive circuit layer 52, a pixel electrode layer 53, a reflective film 54, an alignment film 55, a liquid crystal layer 56, an alignment film 57, a transparent conductive film 58, and a transparent substrate 59 are stacked on a semiconductor substrate 51 in this order.

The semiconductor substrate 51 is, for example, a silicon substrate. The drive circuit layer 52 constitutes an active matrix circuit on the semiconductor substrate 51. The pixel electrode layer 53 includes a plurality of pixel electrodes 53a arranged in a matrix along the surface of the semiconductor substrate 51. Each of the pixel electrodes 53a is formed of, for example, a metal material such as aluminum. A voltage is applied to each of the pixel electrodes 53a by the drive circuit layer 52.

The reflective film 54 is, for example, a dielectric multi-layer film. The alignment film 55 is provided on the surface of the liquid crystal layer 56 on the reflective film 54 side. The alignment film 57 is provided on the surface of the liquid crystal layer 56 on the opposite side of the reflective film 54. Each of the alignment films 55 and 57 is formed of, for example, a polymer material such as polyimide. For example, a rubbing treatment is performed on a contact surface of each of the alignment films 55 and 57 with the liquid crystal layer 56. The alignment films 55 and 57 align liquid crystal molecules 56a contained in the liquid crystal layer 56 in a predetermined direction.

The transparent conductive film 58 is provided on the surface of the transparent substrate 59 on the alignment film 57 side, and faces the pixel electrode layer 53 with the liquid crystal layer 56 and the like interposed therebetween. The transparent substrate 59 is, for example, a glass substrate. The transparent conductive film 58 is formed of, for example, a light transmissive and conductive material such as ITO. The transparent substrate 59 and the transparent conductive film 58 cause the laser light L to be transmitted.

In the spatial light modulator 5 configured as described above, when a signal indicating a modulation pattern is input from the control unit 10 to the drive circuit layer 52, a voltage corresponding to the signal is applied to each of the pixel electrodes 53a. Thus, an electric field is formed between each of the pixel electrodes 53a and the transparent conductive film 58. When the electric field is formed, in the liquid crystal layer 56, the arrangement direction of the liquid crystal molecules 216a changes for each region corresponding to each of the pixel electrodes 53a, and the refractive index changes for each region corresponding to each of the pixel electrodes 53a. This state is a state in which the modulation pattern is displayed on the liquid crystal layer 56. The modulation pattern is for modulating the laser light L.

That is, when, in a state where the modulation pattern is displayed on the liquid crystal layer 56, the laser light L enters into the liquid crystal layer 56 from the outside through the transparent substrate 59 and the transparent conductive film 58, is reflected by the reflective film 54, and then is emitted to the outside from the liquid crystal layer 56 through the transparent conductive film 58 and the transparent substrate 59, the laser light L is modulated in accordance with the modulation pattern displayed on the liquid crystal layer 56. As described above, according to the spatial light modulator 5, it is possible to modulate (for example, modulation of intensity, amplitude, phase, polarization, and the like of the laser light L) the laser light L by appropriately setting the modulation pattern to be displayed on the liquid crystal layer 56. The modulation surface 5a illustrated in FIG. 5 is, for example, the liquid crystal layer 56.

In the present embodiment, the laser irradiation unit 3 irradiates the wafer 20 with the laser light L from the back surface 21b side of the semiconductor substrate 21 along each of the plurality of lines 15, so as to form two rows of modified regions 12a and 12b in the semiconductor substrate 21 along each of the plurality of lines 15. The modified region (first modified region) 12a is the modified region closest to the front surface 21a of the two rows of modified regions 12a and 12b. The modified region (second modified region) 12b is the modified region closest to the modified region 12a among two rows of the modified regions 12a and 12b, and is the modified region closest to the back surface 21b.

The two rows of modified region 12a and 12b are adjacent to each other in the thickness direction (Z-direction) of the wafer 20. The two rows of modified regions 12a and 12b are formed by moving two condensing points C1 and C2 relative to the semiconductor substrate 21 along the line 15. The laser light L is modulated by the spatial light modulator 5 so that, for example, the condensing point C2 is located on the rear side in a traveling direction and on the incident side of the laser light L with respect to the condensing point C1.

As an example, the laser irradiation unit 3 can irradiate the wafer 20 with the laser light L from the back surface 21b side of the semiconductor substrate 21 along each of the plurality of lines 15 under a condition that a fracture 14 extending through the two rows of modified regions 12a and 12b reaches the front surface 21a of the semiconductor substrate 21. As an example, for the semiconductor substrate 21 which is a single crystal silicon substrate having a thickness of 775 µm, the two condensing points C1 and C2 are aligned at positions of 54 µm and 128 µm from the front surface 21a. Then, the wafer 20 is irradiated with the laser light L from the back surface 21b side of the semiconductor substrate 21 along each of the plurality of lines 15.

At this time, the wavelength of the laser light L is 1099 nm, the pulse width is 700 nsec, and the repetition frequency is 120 kHz. In addition, the output of the laser light L at the condensing point C1 is 2.7 W, the output of the laser light L at the condensing point C2 is 2.7 W, and the relative movement speeds of the two condensing points C1 and C2 with respect to the semiconductor substrate 21 are 800 mm/sec.

The formation of such two rows of modified regions 12a, 12b and fracture 14 is performed in the following cases. That is, in a case where, in the subsequent steps, the back surface 21b of the semiconductor substrate 21 is ground to thin the semiconductor substrate 21 and expose the fractures 14 to the back surface 21b, and the wafer 20 is cut into a plurality of semiconductor devices along each of the plurality of lines 15, such formation is performed.

[Adjustment of Condensing Shape]

As described above, in the laser processing device 1, the laser light L output from the light source 31 is incident on the spatial light modulator 5. The modulation pattern is displayed on the spatial light modulator 5. Therefore, the laser light L incident on the spatial light modulator 5 is modulated by the modulation pattern. Then, the laser light L is incident on the condenser lens 33 via the 4f lens unit 34, and condensed on the object 11. Thus, by adjusting the modulation pattern displayed on the spatial light modulator 5, it is possible to adjust the shape (may be referred to as a "condensing shape" below) of the condensing point of the laser light L. An example of adjustment of the condensing shape will be described below.

FIG. 7 is a schematic view for explaining an example of adjustment of the condensing shape. In the example illustrated in FIG. 7, the modulation pattern is offset. More specifically, various patterns such as a distortion correction pattern for correcting the distortion of the wavefront, a grating pattern for branching laser light, a slit pattern, an astigmatism pattern, a coma aberration pattern, and a spherical aberration correction pattern are displayed (a pattern in which the above patterns are superimposed is displayed) on the spatial light modulator 5. It is possible to adjust the condensing shape by offsetting the spherical aberration correction pattern Ps among the above patterns.

In the example in FIG. 7, on the modulation surface 5a, the center Pc of the spherical aberration correction pattern Ps is offset to the negative side in the X-direction by an offset amount Ox1 with respect to the center Lc (of a beam spot) of the laser light L. As described above, the modulation surface 5a is transferred to the incident pupil surface 33a of the condenser lens 33 by the 4f lens unit 34. Thus, the offset on the modulation surface 5a becomes an offset to the positive side in the X-direction on the incident pupil surface 33a. That is, on the incident pupil surface 33a, the center Pc of the spherical aberration correction pattern Ps is offset from the center Lc of the laser light L and the center (here, coincides with the center Lc) of the incident pupil surface 33a to the positive side in the X-direction by an offset amount Ox2.

On the other hand, when the center Pc of the spherical aberration correction pattern Ps is offset to the positive side in the X-direction with respect to the center Lc of the laser light L, on the modulation surface 5a, the center Pc of the spherical aberration correction pattern Ps is offset to the negative side in the X-direction from the center Lc of the laser light L and the center of the incident pupil surface 33a on the incident pupil surface 33a. As described above, by offsetting the spherical aberration correction pattern Ps, the shape of the condensing point C1 (and the condensing point C2) of the laser light L is deformed as compared with a case where there is no offset.

FIG. 8 is a view illustrating an example of the condensing shape (intensity distribution). Each drawing of FIG. 8 illustrates a condensing shape in a cross section including the X-direction and the Z-direction. (a) of FIG. 8 illustrates a condensing shape in a case where the spherical aberration correction pattern Ps is offset to the negative side in the X-direction on the incident pupil surface 33a (that is, the positive side in the X-direction on the modulation surface 5a). (c) of FIG. 8 illustrates a condensing shape in a case where the spherical aberration correction pattern Ps is offset to the positive side in the X-direction on the incident pupil surface 33a (that is, the negative side in the X-direction on the modulation surface 5a). (b) of FIG. 8 illustrates a condensing shape in a case where there is no offset.

As illustrated in FIG. 8, by offsetting the spherical aberration correction pattern Ps in the X-direction, the condensing shape becomes asymmetric with respect to an optical axis center Ax. In particular, as illustrated in (a) of FIG. 8, when the spherical aberration correction pattern Ps is offset to the negative side in the X-direction by using the incident pupil surface 33a as a reference, the intensity distribution biased to the positive side in the X-direction with respect to the optical axis center Ax (arc-shaped intensity distribution protruding to the negative side in the X-direction) is obtained. In addition, as illustrated in (c) of FIG. 8, when the spherical aberration correction pattern Ps is offset to the positive side in the X-direction by using the incident pupil surface 33a as a reference, the intensity distribution biased to the negative side in the X-direction with respect to the optical axis center Ax (arc-shaped intensity distribution protruding to the positive side in the X-direction) is obtained.

FIG. 9 is a view illustrating a change in the condensing shape when the offset amount of the spherical aberration correction pattern is changed in a plurality of stages. In FIG. 9, "offset [pixel] SLM plane" indicates the offset amount on the modulation surface 5a, and the minus sign indicates the negative side in the X-direction. As described above, here, the sign of the offset amount of the spherical aberration correction pattern Ps on the modulation surface 5a is opposite to the sign of the offset amount of the spherical aberration correction pattern Ps on the incident pupil surface 33a.

"BE (μm)" indicates a correction amount of the spherical aberration correction pattern Ps. "Z [μm]" indicates a condensing position of the laser light L in the Z-direction. "CP [μm]" indicates a condensing correction amount. As illustrated in FIG. 9, by changing the offset amount of (the center Pc of) the spherical aberration correction pattern Ps stepwise, it is possible to change the condensing shape stepwise. "(Tertiary) coma aberration" in FIG. 9 indicates the magnitude of the tertiary coma aberration corresponding to each condensing shape.

Figure 10:
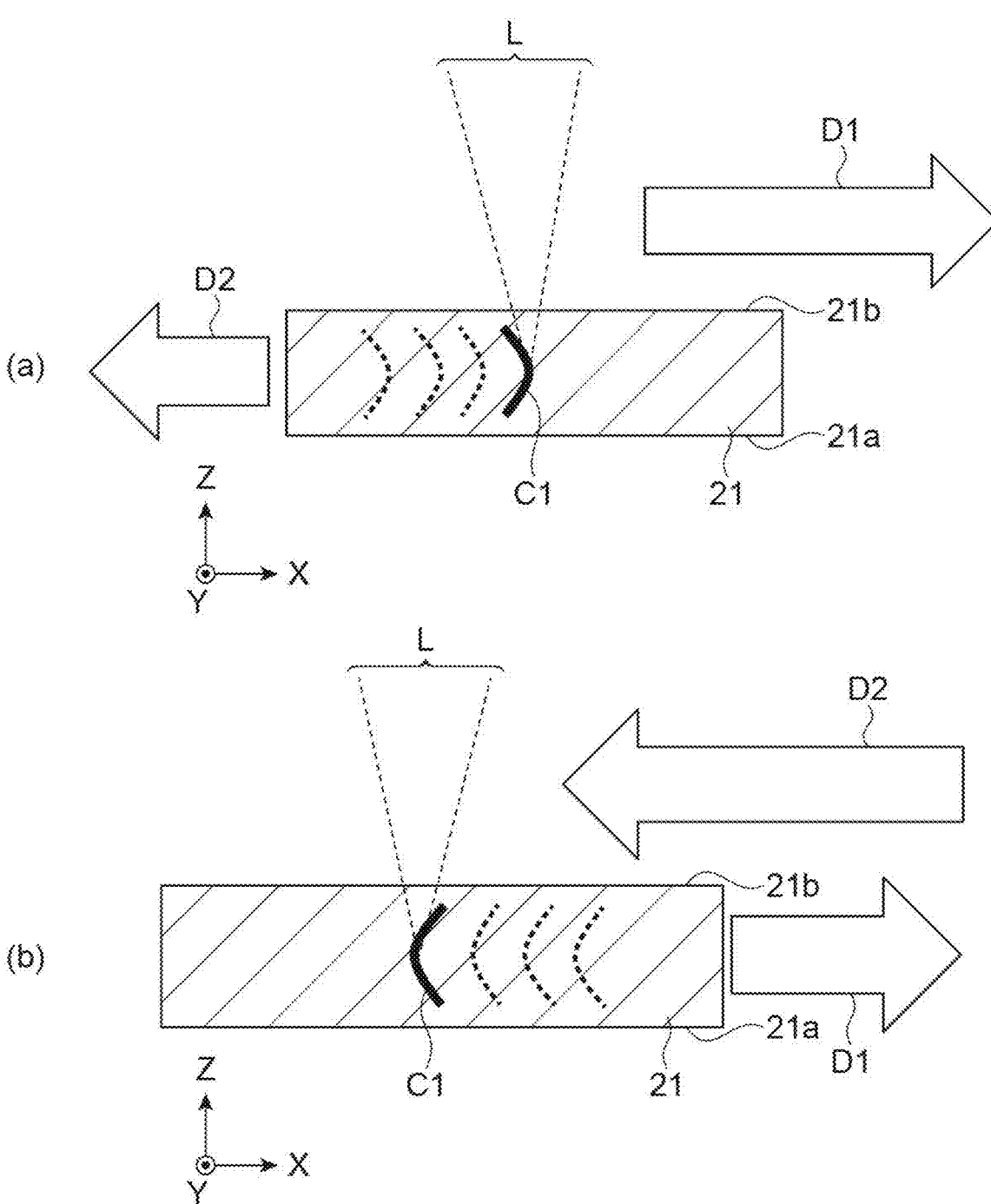
FIG. 10 is a schematic diagram illustrating a state of laser processing in a state where the spherical aberration correction pattern is offset.

As described above, by adjusting the offset amount of the spherical aberration correction pattern Ps to adjust the condensing shape, it is possible to control, for example, a processing result such as the extension amount of the fracture 14. FIG. 10 is a schematic diagram illustrating a state of laser processing in a state where the spherical aberration correction pattern is offset. (a) of FIG. 10 illustrates a first case (may be referred to as "forward processing" below) in which processing is performed by causing the condensing point C1 of the laser light L (the same applies to the condensing point C2 (not illustrated)) to travel in a first direction D1 that is an X positive direction with respect to the semiconductor substrate 21 (wafer 20). Here, by moving the stage 2 and the semiconductor substrate 21 in a second direction that is the opposite direction (X negative direction) of the first direction D1, the condensing point C1 is caused to relatively travel in the first direction D1.

(b) of FIG. 10 illustrates a second case (may be referred to as "backward processing" below) in which the processing is performed by causing the condensing point C1 of the laser light L to travel in the second direction D2 that is the X negative direction with respect to the semiconductor substrate 21. Here, by moving the stage 2 and the semiconductor substrate 21 in the first direction D1, the condensing point C1 is caused to relatively travel in the second direction D2. FIG. 10 illustrates a case where the shape of the condensing point C1 is individually adjusted in the first case and the second case, so as to become an arc shape protruding in the traveling direction of the condensing point C1. That is, the example of FIG. 10 is an example in which the shape is individually adjusted so as to become an arc shape protruding in the first direction D1 in the first case and to become an arc shape protruding in the second direction D2 in the second case. Meanwhile, when processing is performed while maintaining the condensing shape constant in the first case and the second case, the following problem occurs. Here, adjusting (or maintaining constant) the condensing shape means adjusting (or maintaining constant) the offset amount of the spherical aberration correction pattern Ps.

(a) of FIG. 11 illustrates a processing result (extension amount of a fracture) in a case where processing is performed while maintaining the condensing shape constant in the first case (forward processing) and the second case (backward processing). Here, the offset amount (X-offset (pixel)) of the spherical aberration correction pattern Ps is changed in increments of 2 pixels from +6.5 to −6.5, while being constant in the forward processing and the backward processing. A of the processing result indicates a state in which a fracture 14 reaches the front surface 21a of the semiconductor substrate 21, and is an example of a desirable processing result. B of the processing result indicates a state in which the fracture 14 reaches the front surface 21a of the semiconductor substrate 21, but a black streak (region in which no fracture is connected) is formed between the modified region 12a and the modified region 12b. C of the processing result indicates a state in which the fracture 14 does not reach the front surface 21a of the semiconductor substrate 21.

As illustrated in (a) of FIG. 11, in a case where the offset amount (condensing shape) is set to be constant in the forward processing and the backward processing, the offset amount that causes the processing result of A to be obtained in both the forward processing and the backward processing is only a case of "reference" (case where the offset amount is 0). In other words, in a case where the offset amount (condensing shape) is set to be constant in the forward processing and the backward processing, there is no margin for adjustment (being less than at least ±2.5) even though the offset amount is to be adjusted in order to control other processing results, for example.

Figure 12:
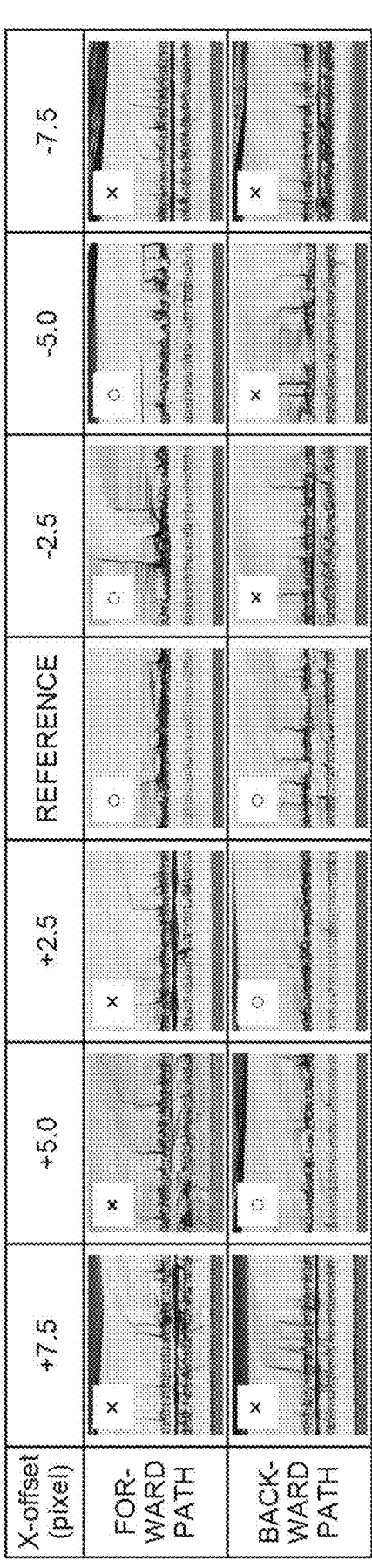
FIG. 12 is a cross-sectional picture showing a relation between the offset amount of the spherical aberration correction pattern and the processing result.

On the other hand, (b) of FIG. 11 and FIG. 12 (FIG. 12 is a cross-sectional picture) illustrate processing results in a case where the offset amount (condensing shape) is individually adjusted in the forward processing and the backward processing, as illustrated in FIG. 10. As illustrated in (b) of FIG. 11 and FIG. 12, in this case, the processing result of A is obtained in a range of the offset amount of −4.5 from the reference in the forward processing, and, in the backward processing, the processing result of A is obtained in a range of the offset amount of +4.5 from the reference. Thus, for example, in a case where the offset amount is set to be adjusted in order to control other processing results, a margin for adjustment of the offset amount of 4.5 is obtained for each of the forward processing and the backward processing.

In the above example, the offset amount of the spherical aberration correction pattern Ps is adjusted in order to adjust the condensing shape. However, the condensing shape can be adjusted by another method using the spatial light modulator 5.

Figure 13:
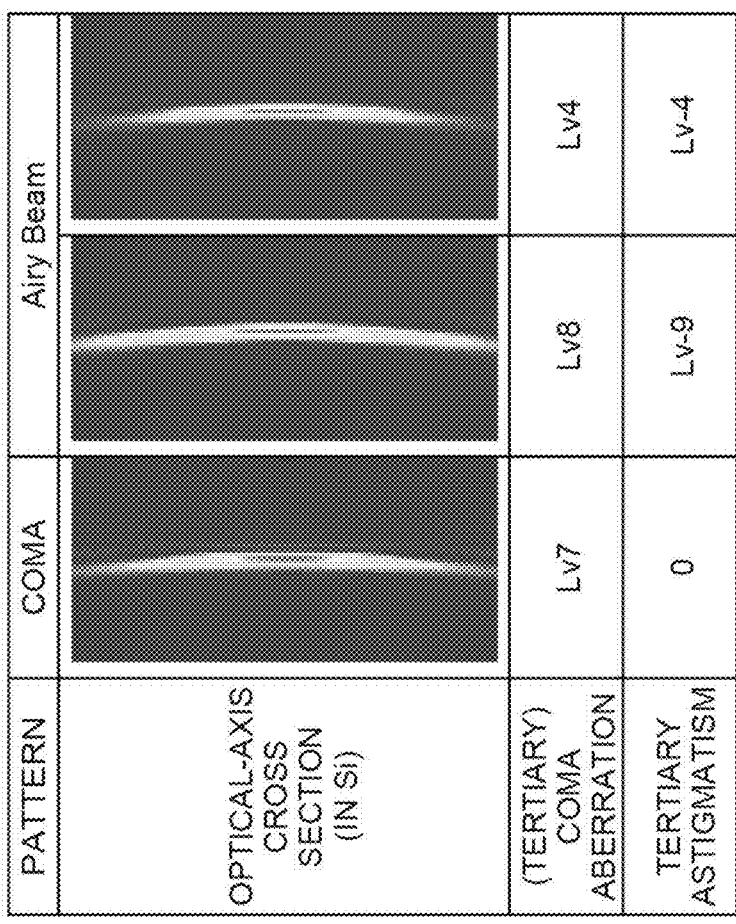
FIG. 13 is a view illustrating a relation between a modulation pattern and the condensing shape.

(a) of FIG. 13 illustrates a condensing shape obtained in a case where the spherical aberration correction pattern Ps is offset as described above. On the other hand, "coma" in (b) of FIG. 13 indicates a condensing shape obtained in a case where the offset amount of the spherical aberration correction pattern Ps is set to 0, the coma aberration pattern is displayed on spatial light modulator 5, and the positive coma aberration is applied to the laser light L. As illustrated in (b) of FIG. 13, also by applying positive coma aberration to the laser light L, it is possible to obtain a condensing shape equivalent to a case where the spherical aberration correction pattern Ps is offset. It is considered that, this is because offsetting the spherical aberration correction pattern Ps is synonymous with giving the coma aberration to the laser light L.

The positive coma aberration is the coma aberration to which a positive coefficient is given in the Zernike polynomial. The third-order term of the polynomial mainly has an influence on the positive coma aberration, but the influence of the higher-order term (for example, the fifth-order term) is also included. In addition, a case where the coma aberration (third order) is Lv7 corresponds to the case where the spherical aberration correction pattern Ps is offset by an offset amount of −5 with the modulation surface 5a as a reference. In addition, the offset amount of the spherical aberration correction pattern Ps and the magnitude of the coma aberration are proportional to each other and increase by a quadratic function. Furthermore, the correction amount (BE [μm]) of the spherical aberration correction pattern Ps and the magnitude of the coma aberration are proportional to each other and increase by a quadratic function.

Furthermore, as indicated with "Airy Beam" in (b) of FIG. 13, even in the modulation pattern for converting the laser light L into an airy beam, it is possible to obtain a condensing shape equivalent to the case where the spherical aberration correction pattern Ps is offset. According to such a modulation pattern, coma aberration and astigmatism (third order) are superimposed, and a result of the superimposition is applied to the laser light L. In any of the above cases, by individually adjusting the modulation pattern in the forward processing and the backward processing, the margin for adjustment of the modulation pattern is enlarged.

[Embodiment of Laser Processing Device]

Based on the above knowledge, the laser processing device 1 according to the present embodiment is capable of adjusting the condensing shape of the laser light L in accordance with the traveling direction of the condensing point C1 of the laser light L. Therefore, in the laser processing device 1, under the control of the input reception unit 103, the control unit 10 causes the input reception unit 103 to display information for urging a user to input a parameter of a modulation pattern such that the modulation pattern is adjusted in accordance with the traveling direction of the condensing point C1 (condensing point C2) of the laser light L with respect to the semiconductor substrate 21 (wafer 20).

Figure 14:
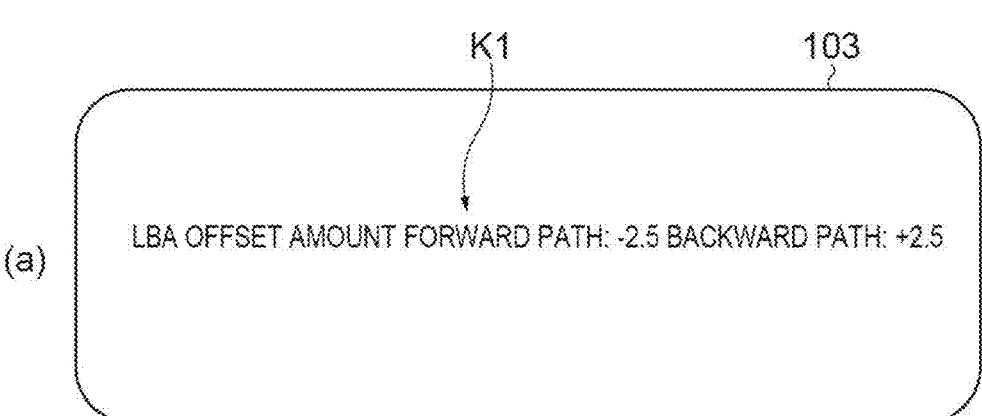
FIG. 14 is a view illustrating an input reception unit in a state where information is displayed.

(a) of FIG. 14 illustrates an example of information K1 displayed on the input reception unit 103. In the information K1, the offset amount (LBA offset amount) of (the center Pc of) the spherical aberration correction pattern Ps in the forward processing and the offset amount of (the center Pc of) the spherical aberration correction pattern Ps in the backward processing are displayed as the parameters of the modulation pattern.

That is, here, under the control of the input reception unit 103, the control unit 10 causes the input reception unit 103 to display information for urging the user to input the offset amount (parameter) of the spherical aberration correction pattern Ps such that the modulation pattern is individually adjusted in the first case (forward processing) where the condensing point C1 travels in the first direction (for example, the X positive direction) with respect to the semiconductor substrate 21 and the second case (backward processing) where the condensing point C1 travels in the second direction (for example, the X negative direction) opposite to the first direction with respect to the semiconductor substrate 21 when viewed from a direction intersecting the incident surface (here, the back surface 21b) of the laser light L of the semiconductor substrate 21 (here, the Z-direction).

Here, as an example, an example in which an offset amount of −2.5 is input in the forward processing and an offset amount of +2.5 is input in the backward processing will be described. On the other hand, the input reception unit 103 receives an input of the offset amount of the spherical aberration correction pattern Ps from the user. Then, the control unit 10 adjusts the modulation pattern based on the offset amount received by the input reception unit 103, and causes the adjusted modulation pattern to be displayed on the spatial light modulator 5.

(b) of FIG. 14 illustrates instruction values of the control unit 10 for the spatial light modulator 5, and illustrates addresses of the center Pc of the spherical aberration correction pattern Ps displayed on the spatial light modulator 5, on the modulation surface 5a. Each value illustrated in (b) of FIG. 14 is not displayed on the input reception unit 103. As described above, in the input reception unit 103, the offset amount of the spherical aberration correction pattern Ps is simply input. On the other hand, the control unit 10 outputs a specific address for realizing the input offset amount to the spatial light modulator 5.

As an example, when an address (X: −15.5, Y: −23.5) of the center of the incident pupil surface 33a of the condenser lens 33 in the X-direction and the Y-direction is provided, the control unit 10 designates the address of the center Pc of the spherical aberration correction pattern Ps on the modulation surface 5a, to be (X: −18.0, Y: −23.5) in the forward processing, and designates the address of the center Pc of the spherical aberration correction pattern Ps on the modulation surface 5a, to be (X: −13.0, Y: −23.5) in the backward processing. This is because, in the above example, the offset amount of the spherical aberration correction pattern Ps is −2.5 in the forward processing and +2.5 in the backward processing.

As described above, the modulation pattern displayed on the spatial light modulator 5 includes the spherical aberration correction pattern Ps, and the offset amount of the spherical aberration correction pattern Ps is included as the parameter of the modulation pattern.

Figure 15:
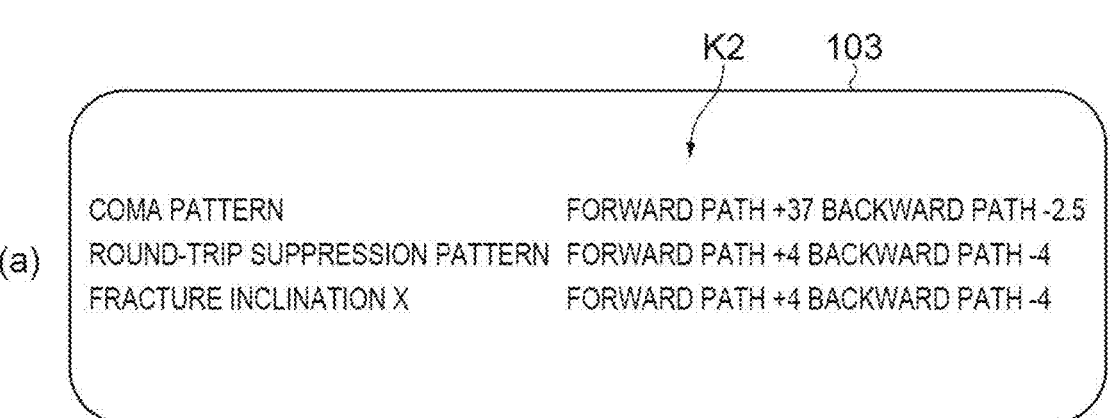
FIG. 15 is a diagram illustrating the input reception unit in a state where information is displayed.

On the other hand, (a) of FIG. 15 illustrates an example of another piece of information K2 displayed on the input reception unit 103. (b) of FIG. 15 illustrates instruction values of the control unit 10 for the spatial light modulator 5, and illustrates the magnitudes of the coma aberration of the coma aberration pattern displayed on the spatial light modulator 5. As illustrated in (a) of FIG. 15, information for urging an input of the magnitude of the coma aberration is displayed on the input reception unit 103 instead of the offset amount of the spherical aberration correction pattern Ps.

Here, "coma pattern" as the information for urging the input of the magnitude of the coma aberration is displayed on the input reception unit 103, so that the user may easily recognize that the mode is a mode for adjusting the coma aberration pattern. In particular, here, instead of the actual value (here, +0.037 and −0.037) of the coma aberration pattern displayed on the spatial light modulator 5 illustrated in (b) of FIG. 15, values (here, +37 and −2.5) that can be easily recognized by the user while corresponding to the actual value can be input. Each value illustrated in (b) of FIG. 15 is not displayed on the input reception unit 103.

On the other hand, even in a case where the control unit 10 adjusts the coma aberration pattern displayed on the spatial light modulator 5, "round-trip suppression pattern" or "fracture inclination X" may be displayed (or another display may be used) instead of displaying "coma pattern" on the input reception unit 103 as described above. That is, here, it is possible to perform any display that is easy for the user to recognize when the user controls the processing result.

As described above, the modulation pattern displayed on the spatial light modulator 5 includes the coma aberration pattern, and the magnitude of the coma aberration is included as the parameter of the modulation pattern.

Figure 16:
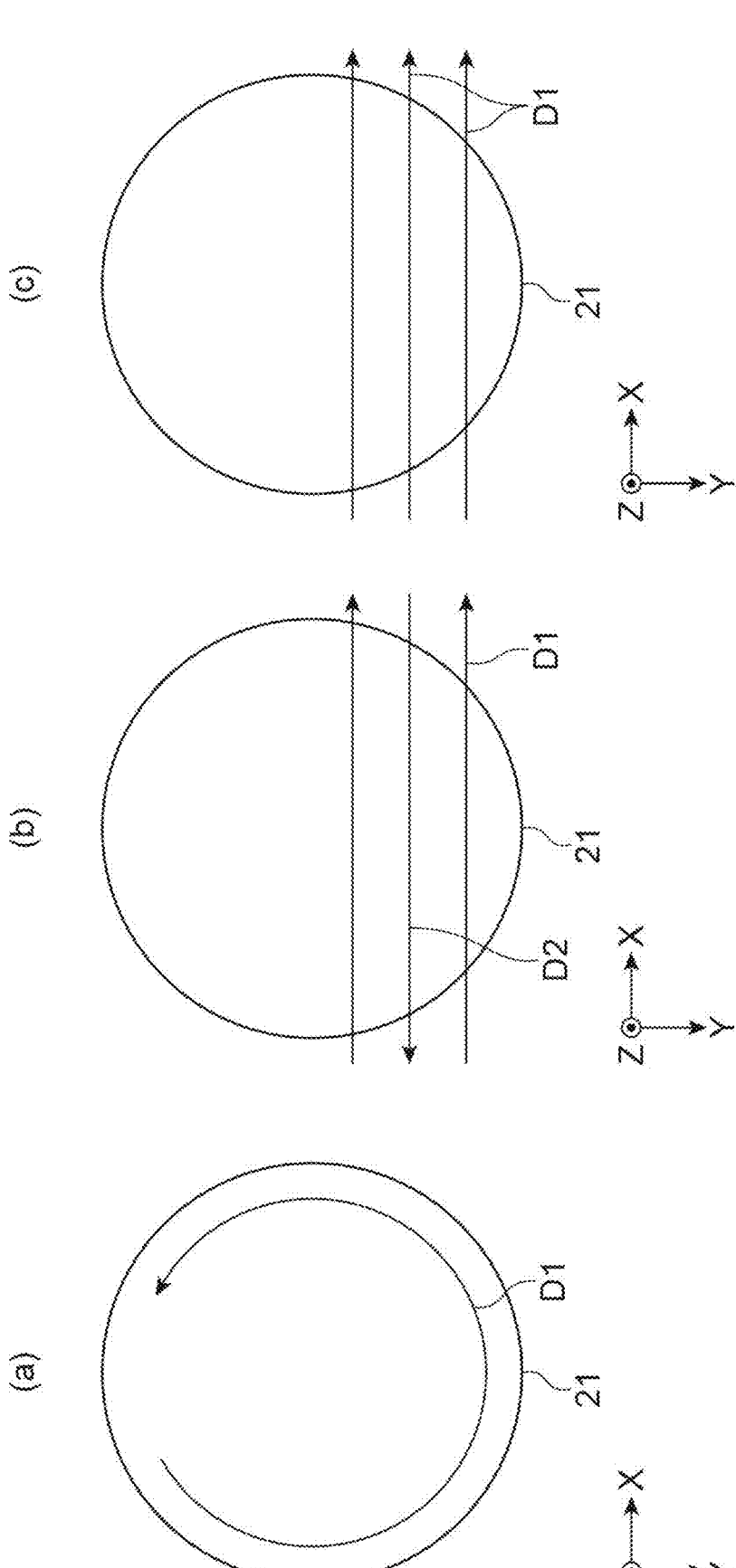
FIG. 16 is a plan view schematically illustrating an example of laser processing.

As described above, the laser processing device 1 performs actual laser processing in a state where the modulation pattern is displayed on the spatial light modulator 5 based on the parameter received by the input reception unit 103. In the laser processing device 1, for example, as illustrated in FIG. 16, various types of laser processing can be performed. In the example illustrated in (a) of FIG. 16, the modified regions 12a and 12b and the fracture 14 are formed along the outer edge of the semiconductor substrate 21 by circularly moving the condensing point C1 (condensing point C2) of the laser light L along the outer edge of the semiconductor substrate 21 (wafer 20).

Thus, an annular region along the outer edge of the semiconductor substrate 21 can be cut off from the semiconductor substrate 21 (trimming processing can be performed) with the modified regions 12a and 12b and the fracture 14 as starting points. In this case, for example, by rotating the stage 2 and the wafer 20 about an axis parallel to the Z-direction, it is possible to cause the condensing point C1 of the laser light L to circle. In this case, the traveling direction (laser traveling direction) of the condensing point C1 of the laser light L is only the first direction D1 that is, for example, the X positive direction, with respect to the semiconductor substrate 21.

Thus, in this case, the laser processing device 1 performs the following operation. The input reception unit 103 displays information for urging the input of the parameter of the modulation pattern such that the modulation pattern is adjusted in accordance with the first direction D1 that is the traveling direction of the condensing point C1 of the laser light L with respect to the semiconductor substrate 21. In addition, the input reception unit 103 receives the input of the parameter, and the control unit 10 adjusts the modulation pattern based on the parameter received by the input reception unit 103 and displays the modulation pattern on the spatial light modulator 5.

On the other hand, in the examples illustrated in (b) and (c) of FIG. 16, the modified regions 12a and 12b and the fracture 14 are formed along each of the lines 15 by relatively moving (scanning) the condensing point C1 of the laser light L along each of the lines 15 with respect to the semiconductor substrate 21. Thus, it is possible to cut (dice) the semiconductor substrate 21 along each of the lines 15 with the modified regions 12a and 12b and the fracture 14 as the starting points.

In the above cases, for one line 15, scanning may be performed an odd number of times or an even number of times while changing the position of the condensing point C1 of the laser light L in the Z-direction. In a case where the scanning is performed the odd number of times, as illustrated in (b) of FIG. 16, the laser traveling direction differs at least between scanning of one line 15 and scanning of another line 15 adjacent to the one line. That is, in this case, the first case (forward processing) where the laser traveling direction is the first direction D1 that is the X positive direction and the second case (backward processing) where the laser traveling direction is the second direction D2 that is the X negative direction are switched at least for each line 15 (in a case where the odd number is equal to or more than 3, switching is performed even in one line).

On the other hand, in a case where the scanning is performed the even number of times, as illustrated in (c) of FIG. 16, the laser traveling direction is the same for a plurality of lines 15, and the first case and the second case are switched in one line 15. Since the first case and the second case are mixed in any case, the laser processing device 1 performs the following operation.

That is, the input reception unit 103 displays the information for urging the input of the parameter such that, when viewed from the direction (Z-direction) intersecting the incident surface (here, the back surface 21b) of the laser light L of the semiconductor substrate 21, the modulation pattern is individually adjusted in the first case where the condensing point C1 travels in the first direction D1 with respect to the semiconductor substrate 21 and the second case where the condensing point C1 travels in the second direction D2 opposite to the first direction D1 with respect to the semiconductor substrate 21. In addition, the input reception unit 103 receives the input of the parameter. Then, the control unit 10 individually adjusts the modulation pattern based on the parameter received by the input reception unit 103, in the first case and the second case and displays the adjusted modulation pattern on the spatial light modulator 5.

In other words, the control unit 10 controls the spatial light modulator 5 to adjust the modulation pattern in accordance with the traveling direction of the condensing point C1 of the laser light L with respect to the semiconductor substrate 21. More specifically, the control unit 10 individually adjusts the modulation pattern in the first case where the condensing point C1 travels in the first direction D1 with respect to the semiconductor substrate 21 and the second case where the condensing point C1 travels in the second direction D2 opposite to the first direction D1 with respect to the semiconductor substrate 21. As described above, the control unit 10 can adjust the modulation pattern by using the offset amount of the spherical aberration correction pattern Ps and/or the magnitude of the coma aberration as the parameters. In this case, the shape of the condensing point C1 is controlled to protrude in the first direction D1 or the second direction.

Thus, the control unit 10 can adjust the modulation pattern so that the shape of the condensing point C1 becomes an arc shape protruding in the first direction D1 in the first case, and adjust the modulation pattern so that the shape of the condensing point C1 becomes an arc shape protruding in the second direction D2 in the second case. Alternatively, the control unit 10 can adjust the modulation pattern so that the shape of the condensing point C1 becomes the arc shape protruding in the second direction D2 in the first case, and adjust the modulation pattern so that the shape of the condensing point C1 becomes the arc shape protruding in the first direction D1 in the second case.

Figure 17:
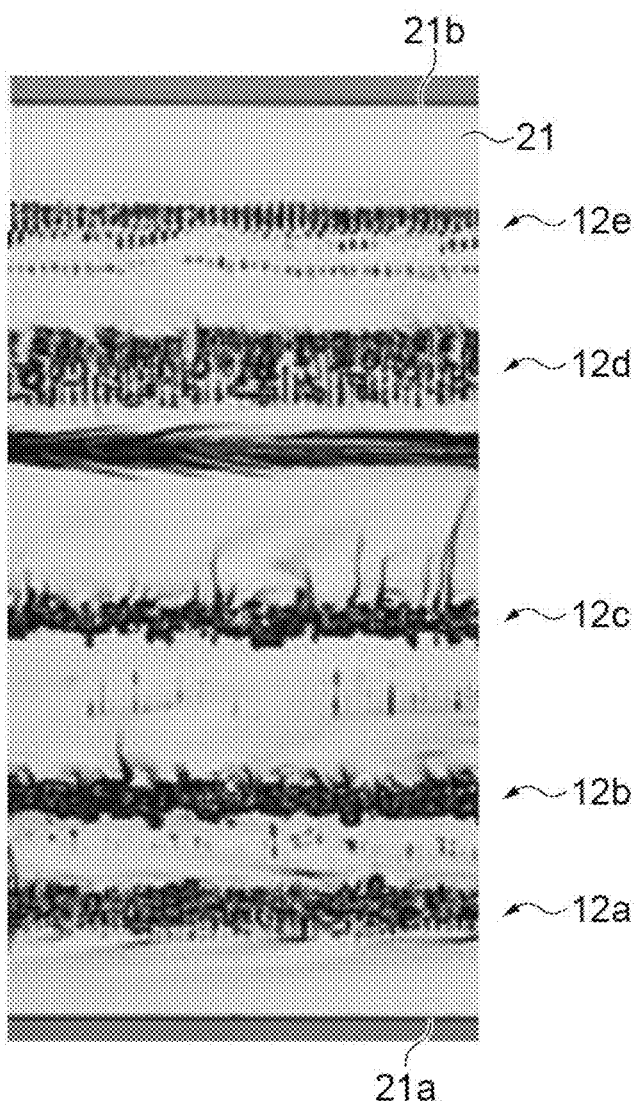
FIG. 17 is a view illustrating a cross section of a semiconductor substrate in a case where odd-numbered stage scanning is performed.

FIG. 17 is a view illustrating a cross section of the semiconductor substrate in a case where odd-numbered stage scanning is performed. Here, the condensing point of the laser light L was set to only the condensing point C1 (one focal point), and scanning was performed five times (5-path processing) from the front surface 21a side. In one line 15 among the plurality of lines 15, first scanning, third scanning, and fifth scanning correspond to the first case (forward processing) where the laser traveling direction is the first direction D1, and a modified region 12a, a modified region 12c, and a modified region 12e are formed, respectively. Similarly, second scanning and fourth scanning correspond to the second case where the laser traveling direction is the second direction D2 (backward processing), and a modified region 12b and a modified region 12d are formed.

On the other hand, in another line 15 adjacent to the above-described one line 15 among the plurality of lines 15, the first scanning, the third scanning, and the fifth scanning correspond to the second case (backward processing) where the laser traveling direction is the second direction D2, and the modified region 12a, the modified region 12c, and the modified region 12e are formed, respectively. Similarly, the second scanning and the fourth scanning correspond to the first case where the laser traveling direction is the first direction D1 (forward processing), and the modified region 12b and the modified region 12d are formed.

At this time, the wavelength of the laser light L was set to 1099 nm, the pulse width was set to 400 nsec, and the repetition frequency was set to 100 kHz. In addition, the output of the laser light L at the condensing point C1 was set to 1.5 W in the first scanning to the fourth scanning and set to 1.3 W in the fifth scanning Furthermore, the relative movement speed of the condensing point C1 with respect to the semiconductor substrate 21 was set to 490 mm/sec.

Furthermore, here, the offset amount of the spherical aberration correction pattern Ps and the magnitude of the coma aberration are adjusted as the adjustment of the parameters of the modulation pattern. The respective parameters are as follows.

First time: The offset amount is −3.5 and the coma aberration is Lv3 in the forward processing, and the offset amount is +3.5 and the coma aberration is Lv-3 in the backward processing.

Second time: The offset amount is −4.5 and the coma aberration is Lv3 in the forward processing, and the offset amount is +4.5 and the coma aberration is Lv-3 in the backward processing.

Third time: The offset amount is −25 and the coma aberration is Lv3 in the forward processing, and the offset amount is +25 and the coma aberration is Lv-3 in the backward processing.

Fourth time: The offset amount is −25 and the coma aberration is Lv3 in the forward processing, and the offset amount is +25 and the coma aberration is Lv-3 in the backward processing.

Fifth time: The offset amount is −25 and the coma aberration is Lv3 in the forward processing, and the offset amount is +25 and the coma aberration is Lv-3 in the backward processing.

Thus, the processing result in which the fracture 14 extending from the modified region 12a reaches the front surface 21a was obtained.

As described above, the laser processing device 1 includes the spatial light modulator 5. Thus, the control unit 10 can adjust the condensing shape by adjusting the modulation pattern displayed on the spatial light modulator 5. In particular, in the laser processing device 1, the control unit 10 adjusts the modulation pattern in accordance with the laser traveling direction and displays the adjusted modulation pattern on the spatial light modulator 5. As described above, according to the laser processing device 1, it is possible to adjust a condensing shape in accordance with a laser traveling direction.

In addition, in the laser processing device 1, the control unit 10 individually adjusts the modulation pattern in the first case where the condensing point C1 travels in the first direction D1 with respect to the semiconductor substrate 21 and the second case where the condensing point C1 travels in the second direction D2 opposite to the first direction D1 with respect to the semiconductor substrate 21. As described above, by individually adjusting the modulation pattern in a case where the laser traveling direction is the first direction and a case where the laser traveling direction is the second direction opposite to the first direction, the margin for adjustment of the modulation pattern is enlarged.

Further, in the laser processing device 1, the control unit 10 may adjust the modulation pattern so that the shape of the condensing point C1 becomes the arc shape protruding in the first direction D1 in the first case, and adjust the modulation pattern so that the shape of the condensing point C1 becomes the arc shape protruding in the second direction D2 in the second case. As described above, by adjusting the modulation pattern so that the condensing shape of the laser light L becomes an arc shape protruding in the traveling direction, it is possible to increase the amount of development of a fracture from the modified region formed at the condensing point C1 of the laser light L.

Further, in the laser processing device 1, the control unit 10 may adjust the modulation pattern so that the shape of the condensing point C1 becomes the arc shape protruding in the second direction D2 in the first case, and adjust the modulation pattern so that the shape of the condensing point C1 becomes the arc shape protruding in the first direction D1 in the second case. As described above, by adjusting the modulation pattern so that the condensing shape of the laser light L becomes an arc shape protruding in an opposite direction of the traveling direction, it is possible to suppress the development of a fracture from a modified region formed at the condensing point C1 of the laser light L.

The laser processing device 1 also includes the input reception unit 103 that displays information and receives an input. The input reception unit 103 displays the information for urging the input of the parameter for adjusting the modulation pattern, and receives the input of the parameter. Then, the control unit 10 adjusts the modulation pattern based on the parameter received by the input reception unit 103. Therefore, it is possible to adjust the modulation pattern in accordance with an input of a user.

In addition, in the laser processing device 1, the modulation pattern includes the spherical aberration correction pattern Ps for correcting the spherical aberration of the laser light L. Then, the parameter includes the offset amount of the center Pc of the spherical aberration correction pattern Ps along the first direction D1 with respect to the center of the incident pupil surface 33a of the condenser lens 33. As described above, by setting the offset amount of the spherical aberration correction pattern Ps as the parameter, it is possible to adjust the condensing shape of the laser light L so that the extension amount of the fracture 14 is controlled.

Furthermore, in the laser processing device 1, the modulation pattern includes the coma aberration pattern for applying the positive coma aberration to the laser light L. Then, the parameter includes the magnitude of the coma aberration. As described above, even though the magnitude of the coma aberration to be applied to the laser light L is set as the parameter, it is possible to adjust the condensing shape of the laser light L so that the extension amount of the fracture 14 is controlled, similar to a case where the offset amount of the spherical aberration correction pattern Ps is set as the parameter.

The above embodiment illustrates one aspect of the present disclosure. Thus, the present disclosure may be modified without being limited to the laser processing device 1 described above.

For example, in the above embodiment, the case where the fracture 14 reaches the front surface 21*a* (the surface opposite to the incident surface) of the semiconductor substrate 21 has been described as an example of a desirable processing result among the processing results. This is an example in which it is desirable that the extension amount of the fracture 14 be large (the fracture 14 is actively extended). In this case, as described above, the parameter of the modulation pattern is adjusted so that the condensing shape becomes the arc shape protruding in the laser traveling direction. On the other hand, it may be desirable that the extension amount of the fracture 14 be small (the fracture 14 is not actively extended). In this case, the parameter of the modulation pattern may be adjusted so that the condensing shape becomes the arc shape protruding in the direction opposite to the laser traveling direction.

Furthermore, in the above embodiment, the example in which the control unit 10 receives the parameter input from the user and adjusts the modulation pattern to be displayed on the spatial light modulator 5 has been described. However, the input of the parameter from the user is not essential, and the control unit 10 may store in advance the parameter of the modulation pattern in accordance with the traveling direction of the condensing point C1 of the laser light L and adjust the modulation pattern in accordance with the parameter.

Further, instead of (or in addition to) displaying the information for urging the input of the offset amount of the spherical aberration correction pattern Ps and/or the magnitude of the coma aberration (and receiving the input), the input reception unit 103 may be configured to display information for urging an input of, for example, the arc degree of the shape of the condensing point C1 (condensing point C2) of the laser light L or the selection of a protruding direction (and receive the input).

INDUSTRIAL APPLICABILITY

There is provided a laser processing device capable of adjusting a condensing shape of laser light in accordance with a traveling direction of a condensing point of the laser light.

REFERENCE SIGNS LIST

1 laser processing device
5 spatial light modulator
10 control unit
31 light source
33 condenser lens
33*a* incident pupil surface (pupil surface)
103 input reception unit (display unit, input unit)
Ps spherical aberration correction pattern

The invention claimed is:
1. A laser processing device comprising:
a light source configured to output laser light;

a spatial light modulator configured to display a modulation pattern for modulating the laser light output from the light source;
a condenser lens configured to condense the laser light modulated by the spatial light modulator on an object;
a control unit configured to control the spatial light modulator to adjust the modulation pattern in accordance with a traveling direction of a condensing point of the laser light with respect to the object; and
the control unit adjusts the modulation pattern so that a shape of the condensing point becomes an arc shape protruding in the traveling direction or in an opposite direction of the traveling direction.

2. The laser processing device according to claim 1, wherein
the control unit individually adjusts the modulation pattern in a first case where the condensing point travels in a first direction with respect to the object, and a second case where the condensing point travels in a second direction opposite to the first direction with respect to the object.

3. The laser processing device according to claim 2, wherein
the control unit
adjusts the modulation pattern so that a shape of the condensing point becomes an arc shape protruding in the first direction in the first case, and
adjusts the modulation pattern so that the shape of the condensing point becomes an arc shape protruding in the second direction in the second case.

4. The laser processing device according to claim 2, wherein
the control unit
adjusts the modulation pattern so that a shape of the condensing point becomes an arc shape protruding in the second direction in the first case, and
adjusts the modulation pattern so that the shape of the condensing point becomes the arc shape protruding in the first direction in the second case.

5. The laser processing device according to claim 1, the laser processing device comprising:
a display unit configured to display information; and
an input unit configured to receive an input, wherein
the display unit displays information for urging an input of a parameter for adjusting the modulation pattern,
the input unit receives the input of the parameter, and
the control unit adjusts the modulation pattern based on the parameter received by the input unit.

6. The laser processing device according to claim 5, wherein
the modulation pattern includes a spherical aberration correction pattern for correcting a spherical aberration of the laser light, and
the parameter includes an offset amount of a center of the spherical aberration correction pattern along the traveling direction, with respect to a center of a pupil surface of the condenser lens.

7. The laser processing device according to claim 5, wherein
the modulation pattern includes a coma aberration pattern for applying a positive coma aberration to the laser light, and
the parameter includes a magnitude of the coma aberration.

* * * * *